United States Patent [19]

Dosaj et al.

[11] Patent Number: 5,174,982

[45] Date of Patent: * Dec. 29, 1992

[54] CONTROL OF CARBON BALANCE IN A SILICON SMELTING FURNACE

[75] Inventors: Vishu D. Dosaj; Cathryn M. Haines; James B. May; John D. Oleson, all of Midland, Mich.

[73] Assignee: Dow Corning Corporation, Midland, Mich.

[ * ] Notice: The portion of the term of this patent subsequent to Apr. 23, 2008 has been disclaimed.

[21] Appl. No.: 626,151

[22] Filed: Dec. 12, 1990

[51] Int. Cl.$^5$ .......................... C01B 33/02; C22B 4/00
[52] U.S. Cl. .................................. 423/350; 204/164; 75/10.36; 423/349
[58] Field of Search .............. 423/348, 349, 350; 204/164; 75/10.36, 10.5

[56] References Cited

U.S. PATENT DOCUMENTS

| | | | |
|---|---|---|---|
| 3,660,298 | 5/1972 | McClincy et al. | 423/350 |
| 4,269,620 | 5/1981 | Johansson | 423/350 |
| 4,981,668 | 1/1991 | Dosai et al. | 423/350 |
| 5,009,703 | 4/1991 | Arvidson et al. | 423/350 |

FOREIGN PATENT DOCUMENTS 0028208  5/1981  European Pat. Off. ............ 423/350

OTHER PUBLICATIONS

Fogler, "Elements of Chemical Reaction Engineering", Prentice Hall, New Jersey (1986), pp. 465-468.

*Primary Examiner*—Olik Chaudhuri
*Assistant Examiner*—Ken Horton
*Attorney, Agent, or Firm*—William F. Boley; Roger E. Gobrogge

[57] ABSTRACT

The present invention is a process for the carbothermic reduction of silicon dioxide to form elemental silicon. Carbon balance of the process is assessed by measuring the amount of carbon monoxide evolved in offgas exiting the furnace. A ratio of the amount of carbon monoxide evolved and the amount of silicon dioxide added to the furnace is determined. Based on this ratio, the carbon balance of the furnace can be determined and carbon feed can be adjusted to maintain the furnace in carbon balance.

3 Claims, No Drawings

CONTROL OF CARBON BALANCE IN A SILICON SMELTING FURNACE

This invention was made with Government support under DE-AC04-871D12624 awarded by the U.S. Department of Energy. The Government has certain rights in this invention.

BACKGROUND OF THE INVENTION

The present invention is a process for the carbothermic reduction of silicon dioxide to elemental silicon, where carbon levels in the smelting furnace are adjusted based on evolved carbon monoxide amounts.

Elemental silicon is produced by the carbothermic reduction of silicon dioxide ($SiO_2$) according to the overall reaction:

$$SiO_2 + 2C \rightarrow Si + 2CO \qquad (1)$$

It is well known to those skilled in the art that this reaction proceeds through a number of intermediate reactions involving the production and reaction of silicon monoxide (SiO) and silicon carbide (SiC). Key intermediate reactions for the purpose of this invention can be summarized as: The reaction of silicon dioxide with carbon to form silicon monoxide, $$2SiO_2 + 2C \rightarrow 2SiO + 2CO \qquad (2)$$

the reaction of silicon monoxide with carbon to form silicon carbide, $$SiO + 2C \rightarrow SiC + CO; \qquad (3)$$

and the reaction of silicon carbide with silicon monoxide to form elemental silicon, $$SiO + SiC \rightarrow 2Si + CO. \qquad (4)$$

The sum of the reactions described in equations (2) through (4) result in the overall reaction described in equation (1).

As equation (1) illustrates, theory would suggest that for a silicon smelting furnace to be in carbon balance two moles of carbon should be added per mole of silicon dioxide. This condition is described as 100 percent carbon theory. However, due to process inefficiencies, operation of a silicon smelting furnace does not proceed exclusively according to reaction (1).

If, for example there is insufficient or unreactive carbon, in bulk or locally, to effect reaction (3) a portion of the silicon monoxide will exit the charge bed in the offgas. This situation can occur due to raw materials selection, bed design, and unbalanced stoichiometry in the bed. The loss of silicon monoxide from the reactor results in reduced recovery of elemental silicon. In addition, in the case of insufficient carbon, increased consumption of carbon electrodes used in the furnace can occur. In extreme cases of carbon deficiency, carbon used as furnace lining may be consumed.

Conversely, if too much carbon is present in the furnace, in bulk or locally, reaction (3) can predominate causing silicon carbide accumulation and reduced silicon production. The accumulated silicon carbide can cause filling of the furnace causing the electrode to be raised out of the proper operating position. In addition, when excess silicon dioxide is added to react with the accumulated silicon carbide, the additional silicon monoxide formed can cause increased electrode consumption and loss of yield.

Therefore, it is important for efficient furnace operation that the furnace be kept in carbon balance. However, as a result of the described inefficiencies, carbon balance in a silicon smelting furnace cannot be maintained by merely adding carbon and silicon dioxide to the furnace in a two to one molar ratio, based on carbon theory.

The inventors describe a process herein for the carbothermic reduction of silicon dioxide to elemental silicon where the emitted amount of carbon monoxide in furnace offgas is measured and the ratio of carbon monoxide to the amount of silicon dioxide added to the furnace determined. Based upon this ratio the carbon balance of the furnace can be determined and corrected as needed.

SUMMARY OF INVENTION

The present invention is a process for the carbothermic reduction of silicon dioxide to form elemental silicon. Carbon balance of the process is assessed by measuring the amount of carbon monoxide evolved in offgas exiting the furnace. A ratio of the amount of carbon monoxide evolved and the amount of silicon dioxide added to the furnace is determined. Based on this ratio, the carbon balance of the furnace can be determined and carbon feed can be adjusted to maintain the furnace in carbon balance.

DESCRIPTION OF THE INVENTION

The instant invention is a process for the carbothermic reduction of silicon dioxide to elemental silicon. The process comprises:

(A) adding silicon dioxide and a carbon source to a substantially closed furnace;

(B) applying energy to the furnace to effect reduction of the silicon dioxide by the carbon source:

(C) determining the amount of carbon monoxide in offgas exiting the furnace;

(D) tapping elemental silicon from the furnace; and (E) adjusting carbon balance of the furnace based upon the amount of carbon monoxide in offgas exiting the furnace and the amount of silicon dioxide added to the furnace.

The instant process employs a substantially closed furnace. By "substantially closed." it is meant that the furnace has a roof for containing gases within the reactor. The substantially closed furnace also contains one or more ports for offgas removal. It is preferred that the substantially closed furnace be sealed as tightly as possible to preclude the undesirable leakage of furnace offgas. The substantially closed furnace, for example, may be similar to that described in Arvidson et al., U.S. Pat. No. 5,009,703.

The silicon dioxide which is added to the substantially closed furnace can be, for example, quartz in its many naturally occurring forms; fused and fumed silica, precipitated silica, and silica flour, in their many forms. The physical form of the silicon dioxide can be, for example, powder, granule, chip. lump, pellet, flake, and briquette.

Other additives may also be added to the furnace, for example phosphorous, as described in Dosaj et al., U.S. Pat. No. 4,898,960, issued Feb. 6, 1990. One or more alloying metals may be added to the furnace during the process, for example, calcium, copper, or iron.

The source of carbon which may be loaded to the furnace can be, for example, carbon black, charcoal, coal, coke, or wood chips or mixtures thereof. The form of the carbon can be, for example, powder, granule, chip, lump, pellet, and briquette.

Energy is applied to the furnace by known means, for example, an open or submerged-arc electrode or a transferred-arc plasma torch. The electricity utilized as the energy source can be direct current or single or multiphase alternating current. A preferred means for supplying energy to the furnace is a submerged-arc carbon or graphite electrode.

The amount of carbon monoxide present in offgas exiting from the furnace is determined. The method of determining the amount of carbon monoxide exiting the furnace is not critical to the instant described process. Any measurement method that allows a determination of moles of carbon monoxide in the furnace offgas is acceptable. The measuring device may be, for example, an online IR spectrometer and flow transmitter.

The described process may be run as a continuous or a batch process. Preferred is a batch process where, at appropriate intervals, silicon is tapped from the furnace. The length of time between the removals of silicon from the furnace will be determined by such factors as furnace size and shape, the power applied, and furnace loading. As an aid in determining the carbon balance of the furnace, the amount of elemental silicon tapped from the furnace can be determined by standard volume or weight measurements.

The carbon balance of the furnace is adjusted based upon an assessment of the ratio of the amount of carbon monoxide in offgas exiting from the furnace to the amount of silicon dioxide added to the furnace. According to equation (1) a furnace operation under balanced conditions should yield two moles of carbon monoxide per mole of silicon dioxide added to the furnace. By monitoring the amount of silicon dioxide added to the furnace and the amount of carbon monoxide contained in the offgas it is possible to determine a ratio indicative of carbon balance within the furnace. The determined ratio can be used to approximate the amount of carbon imbalance in the furnace and to allow the appropriate correction of carbon levels by increasing or decreasing the ratio of carbon to silicon dioxide added to the furnace. In determining the amount of carbon added to the furnace, both the amount of carbon added as feed and carbon contribution from the electrode must be considered.

Table 1 illustrates how the amount of silicon dioxide added to the furnace and the amount of carbon monoxide contained in the offgas can be used to assess carbon balance within a silicon smelting furnace. Carbon balance is represented under the heading "% CT" (percent carbon theory), where 100% carbon theory is defined as the stoichiometric amount of carbon needed to react with 100% of the added silicon dioxide (i.e., a 2:1 molar ration of $C:SiO_2$). The molar ration of carbon to silicon dioxide, for a given percent carbon theory, is presented under the heading "Added $C:SiO_2$." The expected molar ration of carbon monoxide that should be evolved from the process, in relation to the moles of silicon dioxide added, is presented under the heading "Expected $CO:SiO_2$." Also presented, is the predicted carbon imbalance, in moles, for a given % Carbon Theory. The heading "% SiO" refers to the percent of added silicon, as silicon dioxide, lost as silicon monoxide. The heading "SiC" refers to the percent of unrecovered silicon retained in the furnace as silicon carbide. The predicted percent of silicon recovered as elemental silicon for a given tap and a given carbon theory is presented in the column labelled "Si Rec.".

TABLE 1

Relationship of Carbon Balance to Silicon Recovery and Carbon Monoxide Offgas

| % CT | Added $C:SiO_2$ | Expected $CO:SiO_2$ | Predicted C Imbalance | % Si Rec. | % SiO | % SiC |
|---|---|---|---|---|---|---|
| 110 | 2.2 | 2.0 | 0.2 | 80 | — | 20 |
| 107.5 | 2.15 | 2.0 | 0.15 | 85 | — | 15 |
| 105 | 2.1 | 2.0 | 0.1 | 90 | — | 10 |
| 102.5 | 2.05 | 2.0 | 0.05 | 95 | — | 5 |
| 100 | 2.0 | 2.0 | 0.00 | 100 | — | — |
| 97.5 | 1.95 | 1.95 | (0.05) | 95 | 5 | — |
| 95 | 1.9 | 1.9 | (0.10) | 90 | 10 | — |
| 92.5 | 1.85 | 1.85 | (0.15) | 85 | 15 | — |
| 90 | 1.8 | 1.8 | (0.20) | 80 | 20 | — |

Table 1 illustrates that a furnace in carbon balance would be expected to have an observed $CO:SiO_2$ ratio of 2.0. In practice, a $CO:SiO_2$ ratio of about 1.95 to 1.98 has been found to be indicative of a furnace operating in carbon balance, because of less than 100 percent recoveries.

In a first situation, where the furnace is being run with a carbon deficit (i.e., undercoked), the percent carbon theory is less than 100%. In this situation, unreacted silicon monoxide is lost from the furnace and silicon recovery is reduced. The predicted amount of lost silicon monoxide is presented in the column labelled "SiO." Under conditions of carbon deficit, the observed ratio of $CO:SiO_2$ is always less than 2.0 and reflects the actual ratio of carbon to silicon dioxide added to the furnace.

In a second situation, where the furnace is being run with carbon in excess of 100% carbon theory (i.e., overcoked), carbon and silicon are being retained in the furnace as silicon carbide. In an overcoked furnace, the ratio of $CO:SiO_2$ will always be about 2.0. However, this situation can be distinguished from a furnace in carbon balance because silicon production, based on silicon dioxide added to the furnace, will be less than 100%.

A third situation arises when a furnace is overcoked and the molar ration of total carbon being added to the furnace in relation to the silicon dioxide being added is less than 2.0. In this situation, the $CO:SiO_2$ ratio will be greater than 2.0. This increased ratio is the result of accumulated silicon carbide within the furnace being converted to elemental silicon and carbon monoxide.

Therefore, as illustrated in Table 1, the expected ratio of $CO:SiO_2$ and the percent recovery of silicon from the furnace can be used to determine the carbon balance of the furnace and predict the amount of adjustment needed, if any. However, due to factors such as carbon monoxide loss, silicon hold-up in the furnace, and other measurement inaccuracies, the $CO:SiO_2$ ratio will typically only be an approximation of carbon imbalance during any given tap cycle. Therefore, the trend for these values over a number of tap cycles is considered a better indicator of carbon balance, then values for any specific tap cycle.

As illustrated in Table 1. it is also possible to use the ratio of carbon monoxide evolved in furnace offgas to tapped silicon as an indicator of carbon balance within the furnace. However, this method requires that furnace yield be determined as the percent of elemental silicon produced in relation to the amount of silicon added to the furnace as silicon dioxide. This adds additional complexity to the determination of furnace carbon balance.

To better illustrate the above described process the following example is offered. The presented example is not intended to be limiting on the presently claimed process.

Example. The ability to predict carbon balance in a silicon smelting furnace by measuring carbon monoxide evolved in furnace offgas was evaluated. The furnace used for the evaluation was a closed furnace measuring about 2.5 feet in diameter and five feet in height. The power source to the furnace was a 200 kVA AC source attached to a graphite electrode protruding into the furnace body. The process was run as a submerged-arc process. Off-gas from the furnace was sent to a Venturi Scrubber where dust particles were removed. Approximately 80% of the scrubbed offgas was recycled to the furnace to maintain pressure control in the furnace. A sample of the scrubbed offgas was cooled, filtered, and sent to an online infrared (IR) spectrometer (Beckman Instrument Company, Chicago, Ill.) for the measurement of carbon monoxide. Total offgas from the furnace was determined by use of a standard flow transmitter.

The result of this trial run is presented in Table 2. The moles of carbon monoxide evolved in furnace offgas per moles of silicon dioxide added to the furnace, for a tap cycle, are presented under the heading "Cycle $CO:SiO_2$." These values are normalized for a 150 kWh cycle. The ratio of cumulative moles of carbon monoxide evolved in the offgas per cumulative moles of silicon dioxide added as feed is presented in the column labelled "Cumul. $CO:SiO_2$." The carbon theory for the feed mixture of silicon dioxide and carbon is presented under the column labelled accordingly.

Prior to the instant trial run, the furnace had been run under conditions of more than stoichiometric carbon (i.e., overcoked) resulting in the accumulation of silicon carbide in the furnace. Therefore, during tap cycles 6-11 the furnace is going through a transition period consuming silicon carbide, as indicated by tap cycle $CO:SiO_2$ ratios of greater than 2.0. At the conclusion of this SiC consumption phase, the furnace was again undercoked as evidenced by the $CO:SiO_2$ ratios of less than 2.0 for tap cycles 12-19. As the carbon theory increased the furnace went through another transition to an overcoked state, indicated by tap cycles 22-24, where the $CO:SiO_2$ " ratios were approximately 2.0. The carbon theory was again lowered and the furnace taken through a silicon carbide consuming transition, tap cycles 25-28, to a point near ideal. Tap cycles 29-32 represent periodic cycling of silicon carbide formation and consumption before the furnace stabilized. Tap cycles 33-35 are near ideal carbon balance.

The tap cycle $CO:SiO_2$ ratio observations are confirmed by the trend in the cumulative $CO:SiO_2$ ratios shown in Table 2. From values of approximately 2.0, the cumulative $CO:SiO_2$ ratio falls to an average of 1.75 (undercoked) and then increases to a final value of 1.9. The steady state recovery for this run was found to be about 90.8%, which would correspond to a final cumulative $CO:SiO_2$ ratio of 1.9.

TABLE 2

Carbon Monoxide Offgas Levels as Indicator of Closed Furnace Carbon Balance

| Tap No. | Cycle $CO:SiO_2$ | Cumul. $CO:SiO_2$ | Carbon Theory of Feed* (%) |
|---|---|---|---|
| 6 | 2.42 | 1.99 | 89.0 |
| 7 | 2.54 | 1.72 | 89.0 |
| 8 | 2.89 | 1.91 | 89.0 |
| 9 | 2.76 | 1.96 | 89.0 |
| 10 | 2.37 | 2.00 | 89.0 |
| 11 | 2.47 | 2.05 | 89.0 |
| 12 | 1.74 | 2.05 | 89.0 |
| 13 | 1.69 | 1.87 | 89.0 |
| 14 | 1.47 | 1.85 | 88.0 |
| 15 | 1.79 | 1.78 | 88.0 |
| 16 | 2.11 | 1.81 | 88.0 |
| 17 | 1.53 | 1.79 | 88.0 |
| 18 | 1.34 | 1.76 | 88.0 |
| 19 | 1.16 | 1.72 | 88.0 |
| 20 | 2.18 | 1.74 | 88.0 |
| 21 | 2.43 | 1.81 | 88.0 |
| 22 | 1.91 | 1.85 | 88.0 |
| 23 | 2.21 | 1.86 | 88.0 |
| 24 | 1.90 | 1.89 | 88.5 |
| 25 | 2.80 | 1.85 | 89.0 |
| 26 | 2.15 | 1.88 | 89.0 |
| 27 | 2.04 | 1.89 | 88.5 |
| 28 | 2.39 | 1.90 | 88.5 |
| 29 | 1.50 | 1.89 | 88.5 |
| 30 | 2.16 | 1.90 | 90.0 |
| 31 | 1.64 | 1.89 | 90.0 |
| 32 | 2.13 | 1.89 | 89.0 |
| 33 | 2.00 | 1.90 | 89.0 |
| 34 | 1.85 | 1.90 | 88.0 |
| 35 | 1.99 | 1.91 | 89.0 |

*This value does not include electrode carbon.

What is claimed is:

1. A process for the carbothermic reduction of silicon dioxide to elemental silicon the process comprising:
   (A) forming a mixture of silicon dioxide and a carbon source within a substantially closed furnace:
   (B) applying energy to the furnace to effect reduction of the silicon dioxide by the carbon source:
   (C) determining the amount of carbon monoxide in offgas exiting the furnace;
   (D) tapping elemental silicon from the furnace; and
   (E) adjusting carbon balance of the furnace based upon the amount of carbon monoxide in offgas exiting the furnace and the amount of silicon dioxide added to the furnace.

2. A process according to claim 1, where applying energy to the substantially closed furnace is by means of a graphite electrode connected to a direct current power source.

3. A process according to claim 1, where applying energy to the substantially closed furnace is by means of a carbon electrode connected to an alternating current power source.

* * * * *